United States Patent [19]

Hiromasa et al.

[11] 4,399,698
[45] Aug. 23, 1983

[54] GAS FLOW MEASURING APPARATUS

[75] Inventors: Syunichiro Hiromasa; Norio Omori, both of Kariya; Yutaka Kawashima, Okazaki; Yukio Muto, Oobu, all of Japan

[73] Assignee: Nippondenso Co., Ltd., Kariya, Japan

[21] Appl. No.: 264,208

[22] Filed: May 15, 1981

[30] Foreign Application Priority Data

May 16, 1980 [JP] Japan ................. 55/65569

[51] Int. Cl.³ ................. G01F 1/68; G01M 15/00
[52] U.S. Cl. ................. 73/204; 73/118
[58] Field of Search ................. 73/204, 118

[56] References Cited

U.S. PATENT DOCUMENTS

| 3,988,928 | 11/1976 | Edstrom et al. | 73/204 |
| 3,996,799 | 12/1976 | van Putten | 73/204 |
| 4,024,761 | 5/1977 | Djorup | 73/204 |
| 4,089,214 | 5/1978 | Egami et al. | |
| 4,332,157 | 6/1982 | Zemel et al. | 73/204 |

FOREIGN PATENT DOCUMENTS

| 760696 | 3/1978 | Netherlands | 73/204 |
| 839615 | 6/1960 | United Kingdom | 73/204 |

OTHER PUBLICATIONS

Malin et al., "Mass Flow Meter" in IBM Tech. Disc. Bulletin, vol. 21, #8, 1/79.

*Primary Examiner*—Herbert Goldstein
*Attorney, Agent, or Firm*—Cushman, Darby & Cushman

[57] ABSTRACT

A gas flow measuring apparatus is provided with an air flow sensor mounted in a suction duct upstream from a throttle valve and exposed to the air flow through the suction duct. The air flow sensor includes a ceramic flat plate mounted in the suction duct so that the main surfaces of the ceramic flat plate are parallel with the air flow. First and second temperature-dependent resistor coatings are formed on the main surfaces of the ceramic flat plate so that the first resistor coating and the second resistor coating are respectively formed on the downstream and upstream end portions of the ceramic flat plate by printing or evaporating a platinum. An electric heater coating is formed between the first and second resistor coatings but spaced therefrom to affect only the first resistor coating, and the heater coating is also formed by printing or evaporating a platinum. The first and second resistor coatings and the electric heater are connected to a measuring circuit to determine the amount of air flow depending on a difference between output signals of the first and second resistor coatings.

6 Claims, 9 Drawing Figures

GAS FLOW MEASURING APPARATUS

BACKGROUND OF THE INVENTION

This invention relates to a gas flow measuring apparatus, and particularly to an air flow measuring apparatus for measuring the amount of flow of air which an engine, for example, sucks.

There has hitherto been known from, for example, U.S. Pat. No. 4,089,214, an apparatus of this type which comprises a gas flow measuring tube provided in a suction duct of, for example, an automobile engine, an electric heater of a platinum resistance wire provided in the gas flow measuring tube, and temperature dependent resistors respectively provided on the upstream side and downstream side of the electric heater in the gas flow measuring tube, whereby output signals produced from the electric heater and temperature dependent resistors are used to measure the flow of intake air (gas to be measured).

This conventional apparatus has an advantage that the amount of air flow can be measured with a small-sized and simple arrangement. However, this apparatus employs the electric heater and temperature dependent resistors which are each formed of a very fine platinum resistance wire so supported as to float in the flow of intake gas, so that if the platinum resistance wire undergoes mechanical shocks due to back-fire (a phenomenon in which explosive combustion of a mixture of fuel and air in the suction duct is caused by spreading fire originating from abnormal combustion in the combustion chamber when timings of ignition and intake/exhaust valve switching are immaturely adjusted in the engine combustion system), the electric heater and temperature dependent resistors tend to be damaged, thus impairing durability of the apparatus.

The conventional apparatus also includes a resistor wire grid provided at the outlet of the gas flow measuring tube, for protecting the electric heater and temperature dependent resistors from impulsive pressure and high temperature resulting from the back-fire. The resistor wire grid, however, degrades efficiency of suction of air to the engine.

SUMMARY OF THE INVENTION

This invention contemplates elemination of the aforementioned drawbacks and has for its object to provide a highly durable gas flow measuring apparatus which can prevent the electric heater and the temperature dependent resistors from being damaged by back-fire and which can improve the efficiency with which air is sucked into the engine body.

To accomplish the above object, according to the present invention, a gas flow measuring apparatus comprises an electric heater in the form of a metal coating, and first and second temperature dependent resistors each in the form of a metal coating, all of the metal coatings being applied on a flat base. The metal coating electric heater and the metal coating first and second temperature dependent resistors are advantageously different from the conventional electric heater and first and second temperature dependent resistors each in the form of a fine platinum resistance wire having a diameter of, for example, 50 μm.

Further, according to the invention, the amount of flow of air is detected on the basis of the amount of heat transfer within a temperature boundary layer developed near the flat base on which the metal coatings are formed, so that heat consumption and heat loss can be decreased and response can be improved, thereby improving the accuracy of gas flow measurement.

DESCRIPTION OF THE PREFERRED EMBODIMENTS

Figure 1:
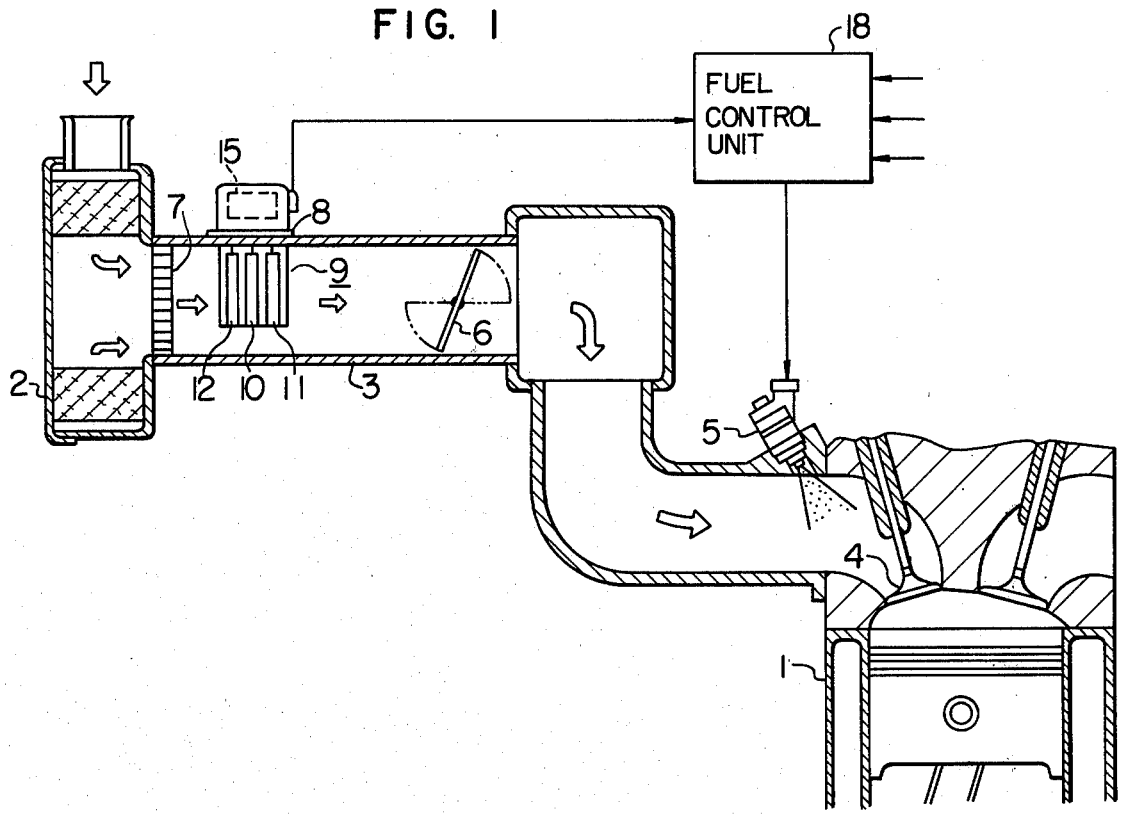
FIG. 1 is a diagrammatic representation useful in explaining mounting status of a gas flow measuring apparatus embodying the invention.

Referring to FIG. 1, reference numeral 1 designates an ignition-type engine body for driving an automobile, in which air for combustion is sucked through an air cleaner 2, a suction duct 3 constituting a gas flow measuring tube and a suction valve 4. Fuel supplied to an electromagnetic fuel injection valve 5 mounted on the suction duct is injected from the valve 5.

The suction duct 3 is provided with a throttle valve 6 arbitrarily operated by a driver, and with a rectifying grid 7 for rectifying air flow at the junction with the air cleaner 2.

In the suction duct 3, between the rectifying grid 7 and the throttle valve 6, there is provided a sensor unit 9 which is placed substantially in parallel with the axial direction of the duct 3 and supported by a support 8. In this sensor unit 9, there are provided, as symbolically shown, a coating of an electric heater 10, a coating of a first temperature dependent resistor 11 located on the downstream side of and close to this electric heater 10, and a coating of a second temperature dependent resistor 12 located on the upstream side of and rather remote from the electric heater 10.

Figure 2A:
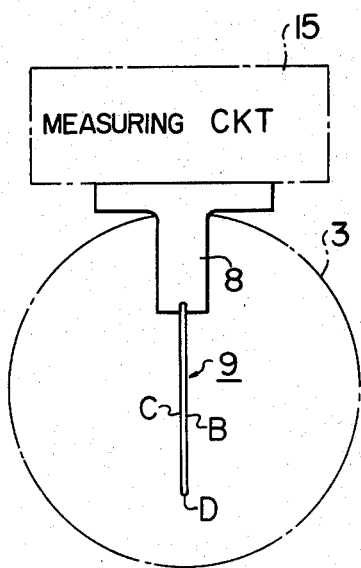
FIG. 2a is a front view of a sensor unit shown in FIG. 1.
Figure 2B:
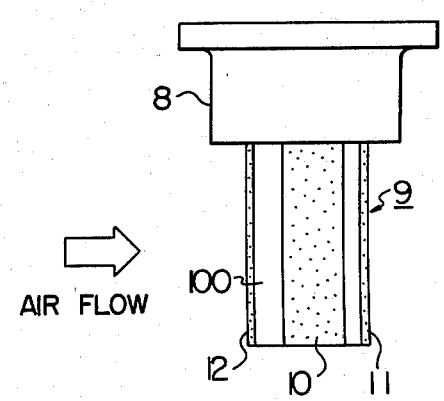
FIG. 2b is a side view of the sensor unit.

Details of the sensor unit 9 are illustrated in a front view of FIG. 2a and a side view of FIG. 2b.

The sensor unit 9 has a flat base 100 of ceramic fixed to the support 8 of an electrically insulating material (for example, bakelite). The second temperature dependent resistor 12, electric heater 10 and first temperature dependent resistor 11, as arranged in this order when viewed in the direction of air flow, are printed on three surfaces B, D and C of the flat base. The positional relationship of the sensor unit 9 to the suction duct 3 is such that, as shown in FIG. 2a, the flat base 100 has substantially no resistance against the flow of air lead wires (not shown) from the electric heater 10 and the first and second temperature dependent resistors 11 and 12 are connected via the upper edges of the surfaces B and C to a measuring circuit 15.

Figure 3:
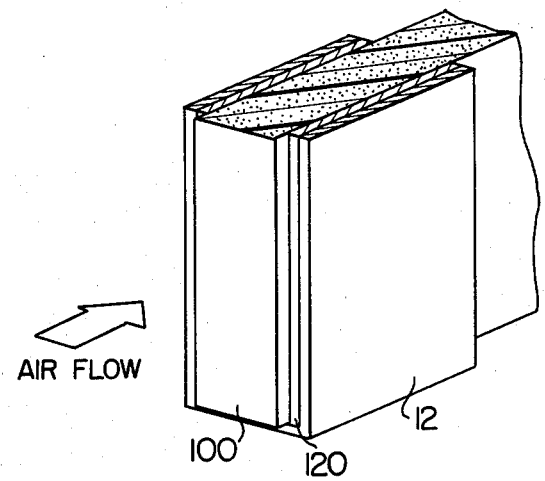
FIG. 3 is a fragmentary perspective view, partly crosssectioned, of the sensor unit.

Specifically, details of the sensor unit 9 will next be described by way of an example of the second temperature dependent resistor 12 with reference to FIG. 3 which is a fragmentary perspective view showing a crosssectional configuration of the sensor unit 9. The ceramic flat base 100 is provided with a metal coating 120 applied by plating a metal such as titanium having bonding intimacy to both ceramic and platinum. A metal coating of platinum is applied on the surface of the titanium coating 120 by printing or vapor deposition to form the second temperature dependent resistor 12. Platinum coatings of the electric heater 10 and the first temperature dependent resistor 11, also applied by printing or vapor deposition, have the same crosssectional configurations as but different occupation areas from the platinum coating of the second temperature dependent resistor 12. The first and second temperature dependent resistors 11 and 12 have the same resistance-temperature characteristic. The material of the metal coatings as exemplified by platinum may alternatively be a platinum alloy.

Figure 4:
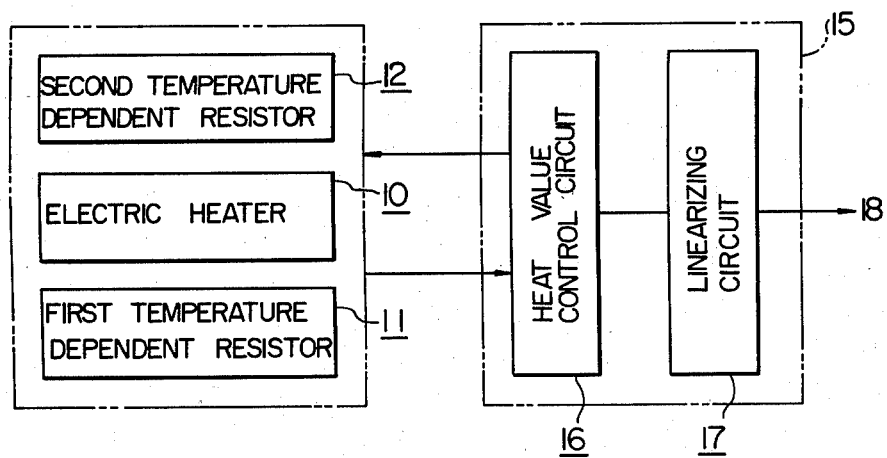
FIG. 4 is a block diagram of the gas flow measuring apparatus shown in FIG. 1.

Referring now to FIG. 4 which shows, in block form, of an overall construction of a gas flow measuring apparatus embodying the invention, the electric heater 10, the first and second temperature dependent resistors 11 and 12 are connected to the measuring circuit 15 which serves to measure the amount of flow of intake air and to produce an electrical signal in accordance with the amount of air flow. This measuring circuit 15 consists of a heat value control circuit 16 and a linearizing circuit 17. The heat value control circuit 16 is responsive to the output signal of a bridge circuit including the first and second temperature dependent resistors 11 and 12 so as to control the voltage to be applied to the electric heater 10 and this bridge circuit. The linearizing circuit 17 functions to correct the output signal from the heat value control circuit 16 so as to be linear with respect to the amount of intake air flow.

Returning to FIG. 1, a fuel control unit 18 is, on the one hand, responsive to a signal from the measuring circuit 15 is supplied, on the other hand, with a signal from a revolution speed sensor (not shown) for detecting the revolution speed of the engine 1, thereby controlling the time during which the electromagnetic fuel injection valve 5 opens.

Figure 5:
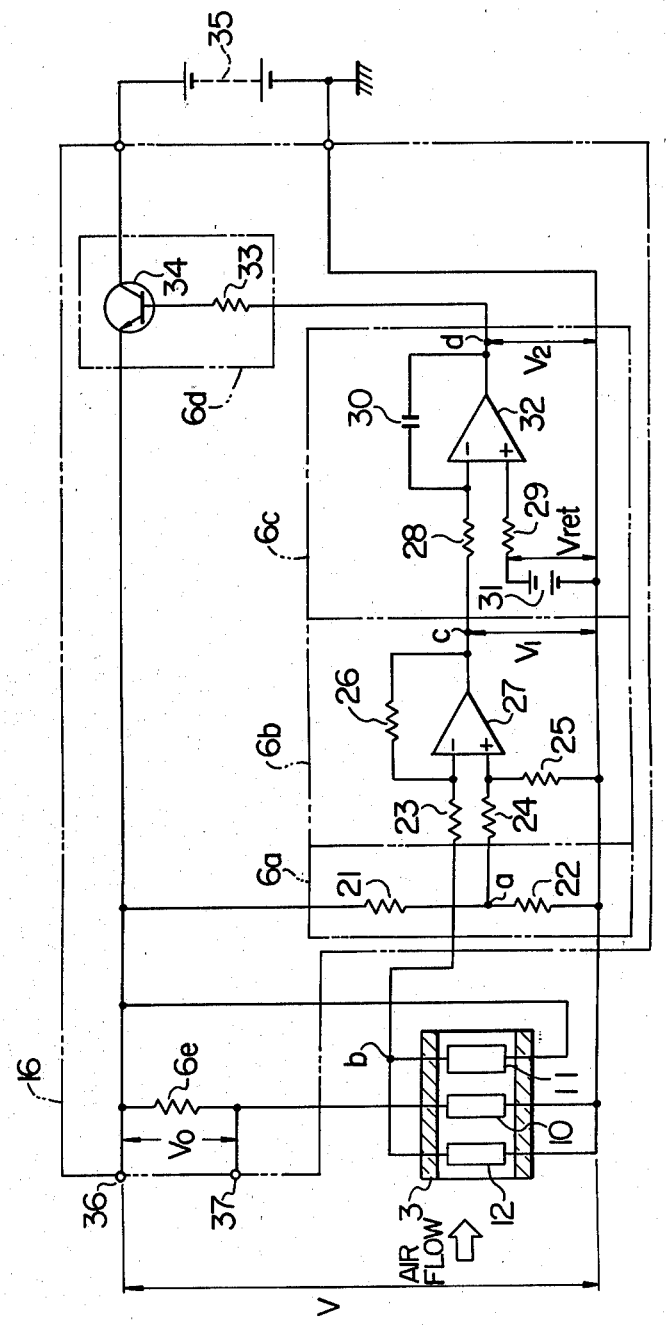
FIG. 5 is a circuit diagram of a heat value control circuit shown in FIG. 4.

The heat value control circuit 16 will hereinafter be described with reference to FIG. 5. This heat value control circuit 16 is generally composed of a reference resistor network 6a, a first differential amplifier circuit 6b, a second differential amplifier circuit 6c, a power amplifier circuit 6d and an output resistor 6e. The reference resistor network 6a consists of resistors 21 and 22 which constitute the bridge circuit together with the temperature dependent resistors 11 and 12 as illustrated symbolically. The first differential amplifier circuit 6b includes input resistors 23 and 24, a ground resistor 25, a negative feedback resistor 26 and an operational amplifier (hereinafter referred to as "OP amp") 27, and functions to differentially amplify the voltage between diagonal points a and b of the bridge circuit to produce an output signal at a terminal c. The second differential amplifier circuit 6c includes input resistors 28 and 29, a capacitor 30, a reference voltage source 31 and an OP amp 32, and differentially amplifies the output voltage at the terminal c and a constant reference voltage Vref of the reference voltage source 31 to produce an output signal at a terminal d. The capacitor 30 serves to prevent oscillation of this circuit.

The power amplifier circuit 6d includes a resistor 33 and a power transistor 34 which is supplied with power from a battery 35, and amplifies the output voltage from the second amplifier circuit 6c to produce an output signal and supply it to the bridge circuit and the electric heater 10. The output resistor 6e is used to supply a voltage Vo concerning the amount of flow of intake air to the linearizing circuit 17 and connected in series with the electric heater 10. Opposite terminals 36 and 37 of the output resistor 6e are connected to the linearizing circuit 17.

Figure 6:
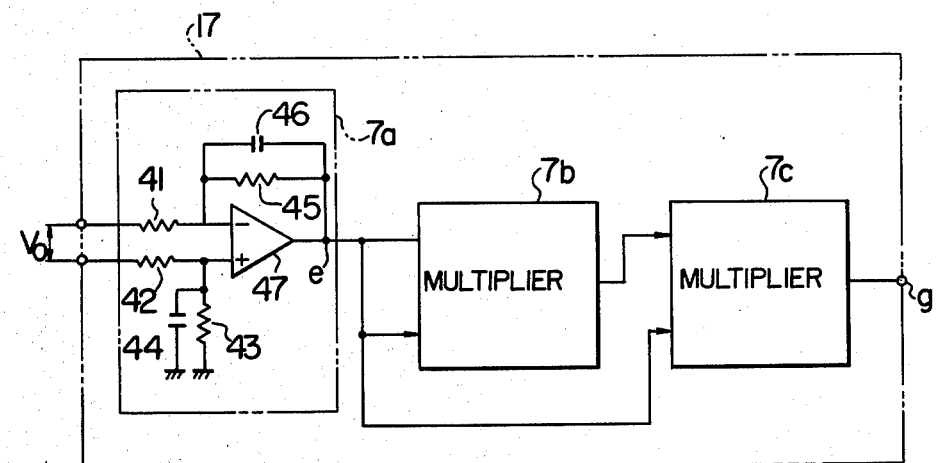
FIG. 6 is a circuit diagram of a linearizing circuit shown in FIG. 4.

The linearizing circuit 17 as shown in FIG. 6 will now be described. This linearizing circuit 17 generally includes a differential amplifier circuit 7a and multipliers 7b and 7c. The differential amplifier circuit 7a includes input resistors 41 and 42, a ground resistor 43, a ground capacitor 44, a negative feedback resistor 45, a capacitor 46 and an OP amp 47, and functions to differentially amplify the output voltage Vo from the heat value control circuit 16 to produce an output signal at a terminal e. The multipliers 7b and 7c are of a well known analog type and function to multiply two input voltages to produce an output voltage in accordance with the product.

The operation of the above-mentioned arrangement will next be described. The amount of air determined by the degree to which the throttle valve 6 opens is sucked into the engine body 1 through the air cleaner 2 and the suction duct 3. Of this total intake air, a predetermined percentage of air creates, near the flat base 100, a temperature boundary layer that is a layer of air which is affected by heat generated by the electric heater and is sucked into the engine body 1. In the sensor unit 9, the second temperature dependent resistor 12 so positioned as to be unaffected by the electric heater 10 is affected only by the temperature of intake air, while the first temperature dependent resistor 11 placed close to the electric heater 10 is affected by the temperature of intake air and the amount of heat generated by the electric heater 10, that is, the temperature of air within the temperature boundary layer which is heated by the electric heater 10.

As a result, a temperature difference $\Delta T$ between the temperature dependent resistors 11 and 12 appears which is dependent on the electric power P [W] supplied to the electric heater 10 and the amount of intake air flow G [g/sec] as expressed by $$K_1 \cdot \Delta T = P/G \tag{1}$$

where $K_1$ is a constant.

The temperature dependent resistors 11 and 12 change in resistance with the temperature of intake air, so that between the points a and b of the bridge, there is produced a potential difference $\Delta V$ which is governed by the temperature difference $\Delta T$ and a voltage V applied to the bridge circuit as shown by $$\Delta V = K_2 \cdot \Delta T \cdot V \tag{2}$$

where $K_2$ is a constant.

Thus, from Equations (1) and (2) the following relationship is derived:

$$K_3 \cdot \Delta V/V = P/G \tag{3}$$

where $K_3$ is a constant.

Thus, if the $\Delta V$ is held constant by controlling power P supplied to the heater 10 and the voltage V applied to the bridge, the amount G of intake air flow can be expressed by $$G = K_4 \cdot P \cdot V \tag{4}$$

where $K_4$ is a constant.

If the value of the output resistor 6e is selected small as compared with that of the electric heater 10 and the current flowing through the electric heater 10 is taken as I, the following equations are given:

$$P \approx K_5 \cdot I^2 \qquad (5)$$

$$V \approx K_6 \cdot I \qquad (6)$$

where $K_5$ and $K_6$ are constants. Thus, from Equations (5) and (6), Equation (4) can be expressed as follows:

$$G \approx K \cdot I^3 \qquad (7)$$

$$\approx K' \cdot V^3 \qquad (8)$$

where K and K' are constants. From the Equations (7) and (8), it will be seen that the amount G of intake air flow is a function of the cube of the current I (or voltage V). The Equations (7) and (8) can be practically used in the measurement without influence on accuracy, though they are approximate.

Thus, the heat value control circuit 16 is used to control the amount of heat generated by the electric heater 10 thereby to hold the potential difference ΔV constant. In other words, if the amount of intake air flow is increased, the temperature rise of air heated by the heater 10 is decreased, resulting in decrease of the temperature difference ΔT between the first and second temperature dependent resistors 11 and 12 and hence decrease of the potential difference ΔV between the points a and b of the bridge circuit.

Therefore, an output voltage $V_1$ from the first differential amplifier circuit 6b is decreased, whereas an output voltage $V_2$ from the second differential amplifier circuit 6c is increased in accordance with the relationship of ($V_{ref} - V_1$). The power amplifier circuit 6d thus increases the current to the electric heater 10 thereby to cause the heater 10 to generate more heat.

As a consequence, the temperature difference ΔT between the first and second temperature dependent resistors 11 and 12 increases, resulting in the increase of the potential difference ΔV between the points a and b of the bridge circuit. When the potential difference ΔV equals the reference voltage $V_{ref}$, the system stabilizes in such a way that the system as a whole comes into the equilibrium state, while the bridge circuit is out of the equilibrium state.

If the amount of intake air flow is decreased, the temperature rise of air heated by the electric heater 10 is increased, resulting in the increase of the temperature difference ΔT between the first and second temperature dependent resistors 11 and 12 and hence increase of the potential difference ΔV.

Accordingly, the output voltage $V_1$ from the first differential amplifier circuit 6b becomes large whereas the output voltage $V_2$ from the second differential amplifier circuit 6c decreases. The power amplifier circuit 6d thus decreases the current to the electric heater 10 thereby to cause the electric heater 10 to decrease heat generation.

As a result, the temperature difference ΔT is decreased and hence the potential difference ΔV is narrowed. When the potential difference ΔV equals the reference voltage $V_{ref}$, the system and the bridge circuit both become stable.

Thus, the potential difference ΔV between the points a and b of the bridge circuit is always held at the constant value $V_{ref}$, independent of the amount of intake air flow, and thus Equation (7) is satisfied, that is, the amount G of intake air flow is expressed by the function of the cube of the current I flowing through the electric heater 10.

This current I also flows through the output resistor 6e, so that the current I is proportional to the voltage Vo across the output resistor 6e and the cube of the voltage Vo varies as the amount G of intake air flow.

Thus, the output voltage Vo from the heat value control circuit 16 is cubed in the linearizing circuit 17. That is, the voltage across the output resistor 6e in the heat value control circuit 16 is amplified by the differential amplifier circuit 7a and thus the voltage of $A_1 \cdot Vo$ is produced at the terminal e, where $A_1$ is the amplification factor of the circuit 7a.

This output voltage $A_1 \cdot Vo$ is supplied to both the input terminals of the multiplier 7b, which then produces voltage of $A_1^2 \cdot Vo^2$. The multiplier 7c is supplied with the voltages of $A_1 \cdot Vo$ and $A_1^2 \cdot Vo^2$ and produces output voltage of $A_1^3 \cdot Vo^3$.

Thus, the linearizing circuit 17 produces at its output terminal g a voltage proportional to the cube of the voltage Vo, or a voltage Vg proportional to the amount of intake air flow. This voltage Vg is applied to the fuel control unit 18 as a signal indicative of the amount G of intake air flow, and the fuel control unit 18 is responsive to this signal to produce an injection pulse signal which causes the fuel injection valve 5 to open. The engine body 1 is thus supplied with air and fuel at a correct air-to-fuel ratio, and thus operated with improved exhaust gas purification, output power and fuel consumption.

Figure 7A:
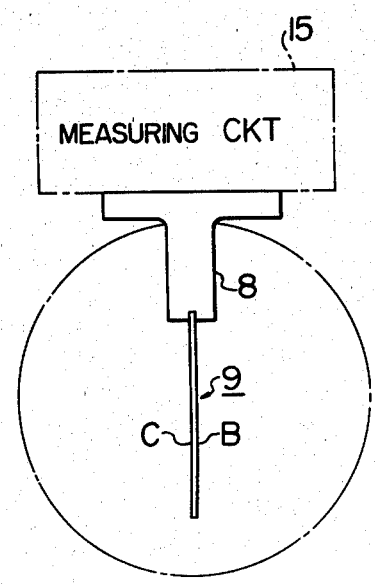
FIG. 7a is a front view of a modified sensor unit.
Figure 7B:
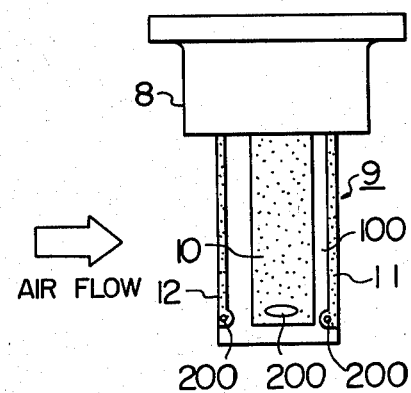
FIG. 7b is a side view of the modified sensor unit.

FIGS. 7a and 7b show respectively a front view and a side view of a modified sensor unit 9 of the invention. Metal coatings formed on surfaces B and C of a ceramic flat base 100 are electrically connected by metal coatings applied in through holes 200 formed in the lower end portion of the flat base 100. Without the metal coatings applied in the through holes, electrical conductors may be inserted in the through holes for establishing the electrical connection.

In place of ceramic used for the flat base 100 as in the foregoing embodiments, a heat resistant and electrically insulative resin may be used.

Also, in place of platinum used for the electrical heater 10 and the first and second temperature dependent resistors 11 and 12, a platinum alloy or another electric resistance metal may be used.

Further, while in the foregoing embodiments, the sensor unit 9 was supported within the suction duct 3 serving as the flow measuring tube, this unit may be supported in a flow measuring tube of a smaller diameter than that of the suction duct which is enclosed by the suction duct.

As has been described, the electric heater and first and second temperature dependent resistors of the gas flow measuring apparatus according to the invention take the form of metal coatings applied on the flat base and hence have a larger strength than that of the conventional platinum resistance wire heater and resistors, thus coping with shocks due to back-fire and improving durability. At the same time, the metal coating heater and resistors can dispense with the resistor grid for coping with the back-fire, so that the engine intake air efficiency can be increased. Further, since the amount of flow of air is detected on the basis of the amount of heat transfer within the temperature affected formation created near the flat base, heat consumption and accordingly heat loss can be decreased as compared with the conventional apparatus and response can be improved, thereby improving accuracy of gas flow measurement.

What is claimed is:

1. In a gas flow measuring apparatus including:
   a gas flow measuring tube through which gas to be measured flows;
   an electric heater provided in said gas flow measuring tube;
   a first temperature dependent resistor provided in said gas flow measuring tube down-stream of said electric heater;
   a second temperature dependent resistor provided in said gas flow measuring tube at a position where there is substantially no thermal effect of said electric heater; and
   a measuring circuit using signals from said first and second temperature dependent resistors, for measuring the amount of flow of gas to be measured, the improvement comprising:
   a base plate of an electrically insulating material mounted in said gas flow measuring tube, on which said electric heater and first and second temperature dependent resistors are formed respectively by metal coatings deposited on said base plate, and
   a T-shaped cross-section support member for supporting said base plate within said gas flow measuring tube such that the longitudinal dimension of said base plate is substantially parallel to the flow of gas within said tube.

2. An improvement according to claim 1, wherein said electric heater and said first and second temperature dependent resistors are vapor deposited metalizations formed on said base plate.

3. An improvement according to claim 1, wherein said base plate is made of ceramic.

4. An improvement according to claim 1, wherein said electric heater formed on said base plate has a larger area than either of the areas of said first and second temperature dependent resistors.

5. An improvement according to claim 1, wherein said electric heater and said first and second temperature dependent resistors are spaced such that the space between said heater and first resistor is smaller than the space between said electric heater and said second temperature dependent resistor.

6. An air flow sensor for for being mounted in an air intake duct of an automobile engine so as to be exposed to air flow into the engine upstream of a throttle valve of the engine, said air flow sensor comprising:
   a flat plate of a heat-resistant and electrically insulating material,
   a T-shaped cross-section support member for attaching said flat plate to an inner wall of said air intake duct so that main surfaces of said flat plate are parallel to the direction of air flow within the duct;
   a first temperature dependent resistor formed on a downstream end of at least one main surface of said flat plate by a metal coating thereon having a resistance that is a function of its temperature;
   a second temperature dependent resistor formed on an upstream end of said main surface of said flat plate by a metal coating having a resistance that is a function of its temperature, said second temperature dependent resistor having the same resistance-temperature characteristic as said first temperature dependent resistor; and
   an electric heater formed on said main surface of said flat plate between said first and second temperature dependent resistors and spaced respectively therefrom said electric heater being formed by a metal coating of high electric resistance;
   said first and second temperature dependent resistors, and said electric heater having respectively electrical connection terminals.

* * * * *